United States Patent
Weissbrem

(10) Patent No.: US 10,082,969 B2
(45) Date of Patent: Sep. 25, 2018

(54) SYSTEM AND METHOD FOR MANAGING A STORAGE SYSTEM

(71) Applicant: Reduxio Systems Ltd., Petah Tiqwa (IL)

(72) Inventor: Uri Weissbrem, Petach Tiqwa (IL)

(73) Assignee: Reduxio Systems Ltd., Petah Tiqwa (IL)

( * ) Notice: Subject to any disclaimer, the term of this patent is extended or adjusted under 35 U.S.C. 154(b) by 57 days.

(21) Appl. No.: 15/415,966

(22) Filed: Jan. 26, 2017

(65) Prior Publication Data
US 2018/0210664 A1  Jul. 26, 2018

(51) Int. Cl.
G06F 3/06     (2006.01)
G06F 12/0875  (2016.01)

(52) U.S. Cl.
CPC .......... *G06F 3/0619* (2013.01); *G06F 3/0653* (2013.01); *G06F 3/0656* (2013.01); *G06F 3/0673* (2013.01); *G06F 12/0875* (2013.01); *G06F 2212/1032* (2013.01); *G06F 2212/154* (2013.01); *G06F 2212/263* (2013.01); *G06F 2212/45* (2013.01)

(58) Field of Classification Search
None
See application file for complete search history.

(56) References Cited

U.S. PATENT DOCUMENTS

| | | | | |
|---|---|---|---|---|
| 6,128,627 A * | 10/2000 | Mattis | ............... | G06F 17/30315 |
| 6,272,648 B1 * | 8/2001 | Findlay | ............... | G06F 11/0709 |
| | | | | 711/145 |
| 7,401,093 B1 * | 7/2008 | Hamilton | .......... | G06F 17/30088 |
| 7,721,062 B1 * | 5/2010 | Fair | ..................... | G06F 11/1435 |
| | | | | 707/690 |
| 7,769,723 B2 * | 8/2010 | Zheng | ............... | G06F 17/30085 |
| | | | | 707/663 |
| 7,996,636 B1 * | 8/2011 | Prakash | ................ | G06F 3/0619 |
| | | | | 711/162 |
| 8,566,546 B1 * | 10/2013 | Marshak | ............... | G06F 3/0604 |
| | | | | 711/112 |
| 8,898,119 B2 * | 11/2014 | Sharma | ................ | G06F 3/0608 |
| | | | | 707/692 |
| 2005/0097260 A1 * | 5/2005 | McGovern | ........... | G06F 3/0623 |
| | | | | 711/100 |

(Continued)

*Primary Examiner* — Mano Padmanabhan
*Assistant Examiner* — Jean C Edouard
(74) *Attorney, Agent, or Firm* — Pearl Cohen Zedek Latzer Baratz LLP

(57) ABSTRACT

A system and method for managing a storage system may include recording, in a cache memory, data related to user writes to the storage system; setting a time in a next consistency point (NCP) object with a value greater than the current time; and maintaining a first counter related to the number of user writes recorded in the cache memory and that occurred before the time included in the NCP object and after a time included in a consistency point (CP) object; maintaining a second counter related to the number of user writes that were stored in a persistent storage system and that occurred before the time in the NCP object and after a time in the CP object. A system and method for managing a storage system may include initializing the storage system to a consistent state based on the time included in the CP object.

17 Claims, 4 Drawing Sheets

(56) References Cited

U.S. PATENT DOCUMENTS

2005/0114607 A1* 5/2005 Cohen ................ G06F 12/1027
711/135
2006/0184587 A1* 8/2006 Federwisch ......... G06F 11/1451
2010/0174879 A1* 7/2010 Pawar .................. G06F 3/0608
711/161
2014/0331011 A1* 11/2014 Kesavan .............. G06F 3/0689
711/133

* cited by examiner

SYSTEM AND METHOD FOR MANAGING A STORAGE SYSTEM

FIELD OF THE INVENTION

The present invention relates generally to managing a storage system. More specifically, the present invention relates to maintaining consistency of data in a storage system that includes a buffer or cache for write operations.

BACKGROUND OF THE INVENTION

Modern storage systems use a buffer or a cache system designed to increase speed of operation. Typically, data to be stored in the storage system that includes a persistent storage device is first stored in a cache that is much faster than the persistent storage device and is subsequently moved or copied from the cache to the persistent device. However, if a storage system is unexpectedly shut down (or crashes as known in the art), e.g., due to a power cut, data in a cache may be lost and data consistency in the storage system may be jeopardized. For example, following a crash, a user may be unable to determine which of the data objects or elements written to the cache prior to the shutdown were also stored in the persistent device.

SUMMARY OF THE INVENTION

In some embodiments, data related to user writes to a storage system may be stored, included or recorded in a cache memory, device or system. A time stored in a next consistency point (NCP) object may be set to a value greater (e.g. later, in the future compared to) than the current time. A first counter related to the number of user writes that are recorded in the cache memory and that occurred before the time included in the NCP object may be maintained or stored. A second counter related to the number of user writes that were stored in a persistent storage system and that occurred before the time included in the NCP object may be maintained or stored, wherein the persistent storage system is included in the storage system.

A third counter related to the number of user writes recorded in the cache memory after the time in the NCP object may be updated, stored or maintained. A fourth counter related to the number of user writes that were stored in the persistent storage system after the time in the NCP object may be maintained, and if the first and second counters are equal, and the current time is later or greater than the time included in the NCP object, then a time in a consistency point (CP) object may be set to the time included in the NCP object.

Upon updating the time in the CP object, the first counter may be updated with, or set to, the value of the third counter and the second counter may be updated with, or set to, the value of the fourth counter. Updating the time in the NCP object may include selecting a time interval value based on at least one of: a predefined time interval, a number of expected user writes per time period and a size of the cache memory; and selecting a value for the time in the NCP object based on the time in the CP object and based on the selected time interval.

An embodiment may check if the first and second counters are equal based on at least one of: a predefined time interval, a number of expected user writes per time period and a size of the cache memory. A storage system may be initialized to a consistent or known state by deleting, from a persistent storage system included in the storage system, data related to user writes that occurred after the time in an CP object. A timestamp for each user write operation that included writing data to the persistent storage system may be stored or recorded; and an embodiment may delete, from the persistent storage system, all user writes associated with a time value that is greater than the time in an CP object.

BRIEF DESCRIPTION OF THE DRAWINGS

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
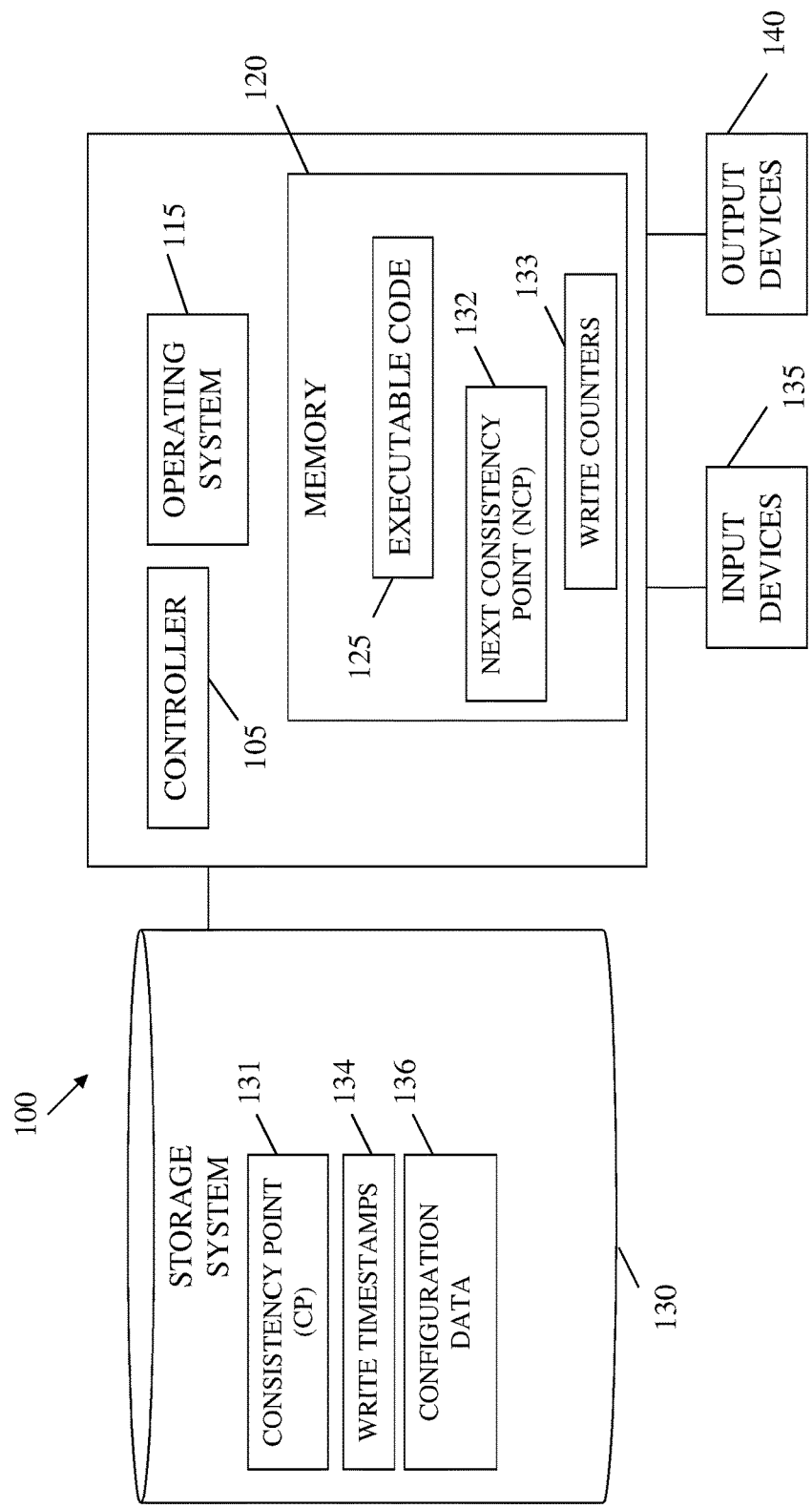
FIG. 1 shows high level block diagram of a computing device according to illustrative embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining,"

"establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, showing a high-level block diagram of a computing device 100 according to some embodiments of the present invention. Computing device 100 may include a controller 105 that may be, for example, a central processing unit processor (CPU), a chip or any suitable computing or computational device, an operating system 115, a memory 120, executable code 125, a storage system 130, input devices 135 and output devices 140. Controller 105 (or one or more controllers or processors, possibly across multiple units or devices) may be configured (e.g., by executing software or code) to carry out methods described herein, and/or to execute or act as the various modules, units, etc.

More than one computing device 100 may be included in, and one or more computing devices 100 may be, or act as the components of, a system according to some embodiments of the invention. For example, client computing device 210 and server 250 described herein may be, or may include components of, computing device 100. By executing executable code 125 stored in memory 120, controller 105 may be configured to carry out a method of managing a storage system as described herein. For example, controller 105 may be configured to manage a storage system by maintaining, updating and/or setting a time in a consistency point object and, upon a reset or reboot of the storage system, configuring or setting the storage system to a consistent state based on the time in the consistency point object.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM. Some embodiments may include a non-transitory storage medium having stored thereon instructions which when executed cause the processor to carry out methods disclosed herein.

Executable code 125 may be any executable code, e.g., an application, a program, a process, task or script. Executable code 125 may be executed by controller 105 possibly under control of operating system 115. For example, executable code 125 may be an application that manages a storage system as further described herein. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein. For example, units or modules described herein (e.g., storage management unit 251) may be, or may include, controller 105, memory 120 and executable code 125.

Storage system 130 may be or may include, for example, a hard disk drive, a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1 may be omitted. For example, memory 120 may be a non-volatile memory having the storage capacity of storage system 130. Accordingly, although shown as a separate component, storage system 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays or monitors, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more devices such as computing device 100.

As shown, storage system 130 may include, or may be used for storing, a CP object 131. As further shown, an NCP object 132 may be stored in a memory, e.g., in memory 120. CP 131 and NCP 132 may be any objects or constructs used for storing a time value or a timestamp. For example, CP 131 may be a file, or object stored for example in a database and NCP 132 may be a memory segment or object in a memory that may store a time value or a timestamp, for example, an NCP object may include a time value that is later or greater than the current time, e.g., a time in the future compared to the current time.

e.g., CP 131 and NCP 132 may include or store a time value that may be a Unix time as known in the art, e.g., to include, reflect or indicate a specific date and time, CP 131 and/or NCP 132 may include or store the number of seconds that passed since Jan. 1, 1970 until the specific date and time, e.g., a timestamp may reflect or represent the time of the last write request or operation. In some embodiments, CP 131 and/or NCP 132 may include a monotonic counter reflecting the number of write requests or operations or the number of transactions. For example, CP 131 and/or NCP 132 may count the number of write operations or requests (e.g., from client computing devices 210) and/or the number of writes (or commits) to persistent storage system 253 as further described herein. Committing or commit data or writes as referred to herein (and in the art) may include storing data in a persistent data storage, for example, writing or storing data in a hard disk may be referred to herein as committing the data.

System 100 may include, e.g., in memory 120 as shown, write counters 133. Write counters 133 may be or may include any object in a memory that reflects the number of write or other operations. For example, a first counter included in write counters 133 may be updated or incremented every time a request to write data to a storage system is received and a second counter included the write counters 133 may be updated or incremented every time data is written to a persistent storage system or device and/or every time data is written to a caching system or device.

As shown, storage system 130 may include, or may be used for storing, write timestamps 134. For example, the time data is written to a persistent storage and/or to a cache may be recorded, stored or included in write timestamps 134, accordingly, the time data was received, stored in, and/or written to a storage system or device may be available to an embodiment and may be used as described herein. As shown, storage system 130 may include, or may be used for storing, configuration data 136 that may include, for example, rules, thresholds, predefined values and/or any other configuration data as further described herein.

The term "cache" as referred to herein may relate to any caching system device or component, e.g., a computing device 100 connected to a volatile memory (e.g., in cache 252) and adapted to receive data, store received or other data in a memory and/or transfer data stored in a memory to a storage system, e.g., to a persistent storage system or device. Cache 252 may for example reduce the average cost (time or energy) of writing data. Cache 252 may be for example a small and fast memory which may store copies of data that may subsequently be written (or committed) to a persistent storage.

The terms "persistent storage" and "persistent storage system" or "persistent storage device" as referred to herein may relate to any long term, nonvolatile storage system, device or component. For example, a persistent storage system may be a hard disk or an array of hard disks or drives, e.g., a redundant array of inexpensive disks, or redundant array of independent disks (RAID) as known in the art.

Figure 2:
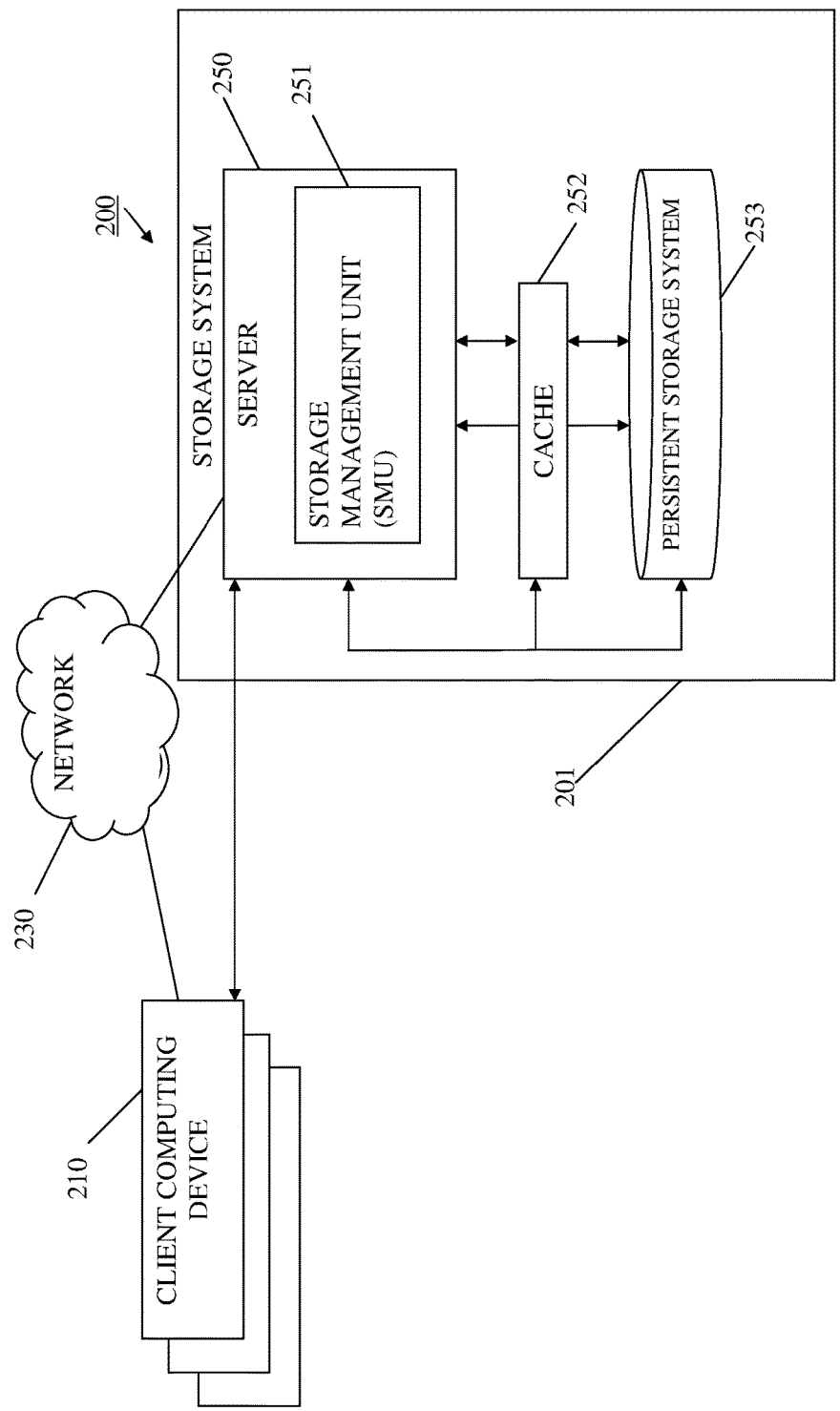
FIG. 2 is an overview of a system according to illustrative embodiments of the present invention.

Reference is made to FIG. 2, an overview of a system 200 and flows according to some embodiments of the present invention. System 200 or components of system 200 may include components such as those shown in FIG. 1. For example, storage management unit (SMU) 251 may be, or may include components of computing device 100, e.g., SMU 251 may include a controller 105, a memory 120 and executable code 125.

As shown, a storage system 201 may include or may be connected to client computing devices 210. For example, client computing devices may be computers of users (e.g., in an organization) that use persistent storage 253 in storage system 201 for storing their data. Server 250 in storage system 201 may be any suitable server computer as known in the art. SMU 251 in storage system 201 may be a unit or module that may be included in server 250. For example, SMU 251 may be an application or program that, using a controller, memory and executable code in server 250, performs methods as described herein. Cache 252 in storage system 201 may be any caching device or system as known in the art, e.g., cache 252 may include a volatile memory. As shown, cache 252 may be operatively connected to server 250 and/or SMU 251. For example, cache 252 may be a unit or device external to server 250 or it may be included or embedded in server 250. Persistent storage system 253 may be any suitable persistent storage system or device, e.g., an array of hard drives.

Network 230 may be, may include or may be part of a private or public IP network, or the internet, or a combination thereof. As shown, network 230 may enable client computing devices 210 to communicate, or exchange date with, storage system 201, e.g., with server 250 in storage system 201, e.g., client computing devices 210 may use network 230 to send data to be stored in persistent storage system 253 and/or retrieve data from persistent storage system 253.

Network 230 may be, comprise or be part of a global system for mobile communications (GSM) network. For example, network 230 may include or comprise an IP network such as the internet, a GSM related network and any equipment for bridging or otherwise connecting such networks as known in the art. In addition, network 230 may be, may include or be part of an integrated services digital network (ISDN), a public switched telephone network (PSTN), a public or private data network, a local area network (LAN), a metropolitan area network (MAN), a wide area network (WAN), a wireline or wireless network, a local, regional, or global communication network, a satellite communication network, a cellular communication network, any combination of the preceding and/or any other suitable communication means. Accordingly, numerous elements of network 230 are implied but not shown, e.g., access points, base stations, communication satellites, GPS satellites, routers, telephone switches, etc. It will be recognized that embodiments of the invention are not limited by the nature of network 230.

As described, when a storage system that uses a cache crashes, data in the cache may be lost, e.g., since a cache typically includes a very fast, but volatile, memory. Accordingly, maintaining consistency of data in storage systems is a challenge faced by the industry.

An embodiment may limit the amount or age of data lost when a system crashes. For example, user commands or data writes send to storage system 210 may not be stored immediately, e.g., in persistent storage system 253. For example, to improve performance and speed of operation, data received from client computing device 210 may first be stored in cache 252 and, at a later stage, the data may be copied to persistent storage system 253.

In prior art systems, if a storage system that uses a cache crashes, data in the cache may be lost. Limiting the loss of data, e.g., to the past few seconds or other predefined and/or known time interval, such that consistency related to a known (and short) past time point, is highly desirable. However, known systems and methods fail to meet such challenge, e.g., data in a cache used by known systems and methods is typically lost when a system crashes thus leaving the system in an inconsistent state, e.g., a user does not know whether or not data sent to a storage system is indeed stored in a persistent storage system (or was lost since it was only stored in a cache).

In some embodiments, user transactions (or write operations that include data to be stored in storage system 201) may be given, assigned, or associated with, a timestamp. The timestamp may be written to a persistent storage system with the data or payload of a data write. For example, a timestamp may be stored as metadata with data (or payload) stored in persistent storage system 253 such that each data object or portion stored in persistent storage system 253 is associated with (or includes) a timestamp that indicates or reflects the time the payload in a write operation, data object or data portion was written to a cache, e.g., written to cache 252 as described.

In some embodiments, a global timestamp may be maintained or updated. For example, a global timestamp may be stored, set to, or updated based on, the timestamp of the last payload, data object or portion that was stored in, or written to, persistent storage system 253. Following a crash of storage system 201, an embodiment may remove, from persistent storage system 253, all data writes, payloads, data objects or data portions associated with a timestamp that is higher (or later than) the global timestamp.

A crash of a storage system 201 may be, or may include a crash of a component of storage system 201, e.g., a crash may include, or be caused by a malfunction of cache 252 or by a shutdown of server 250, e.g., by accident, inadvertently or due to a power cut.

Figure 3:
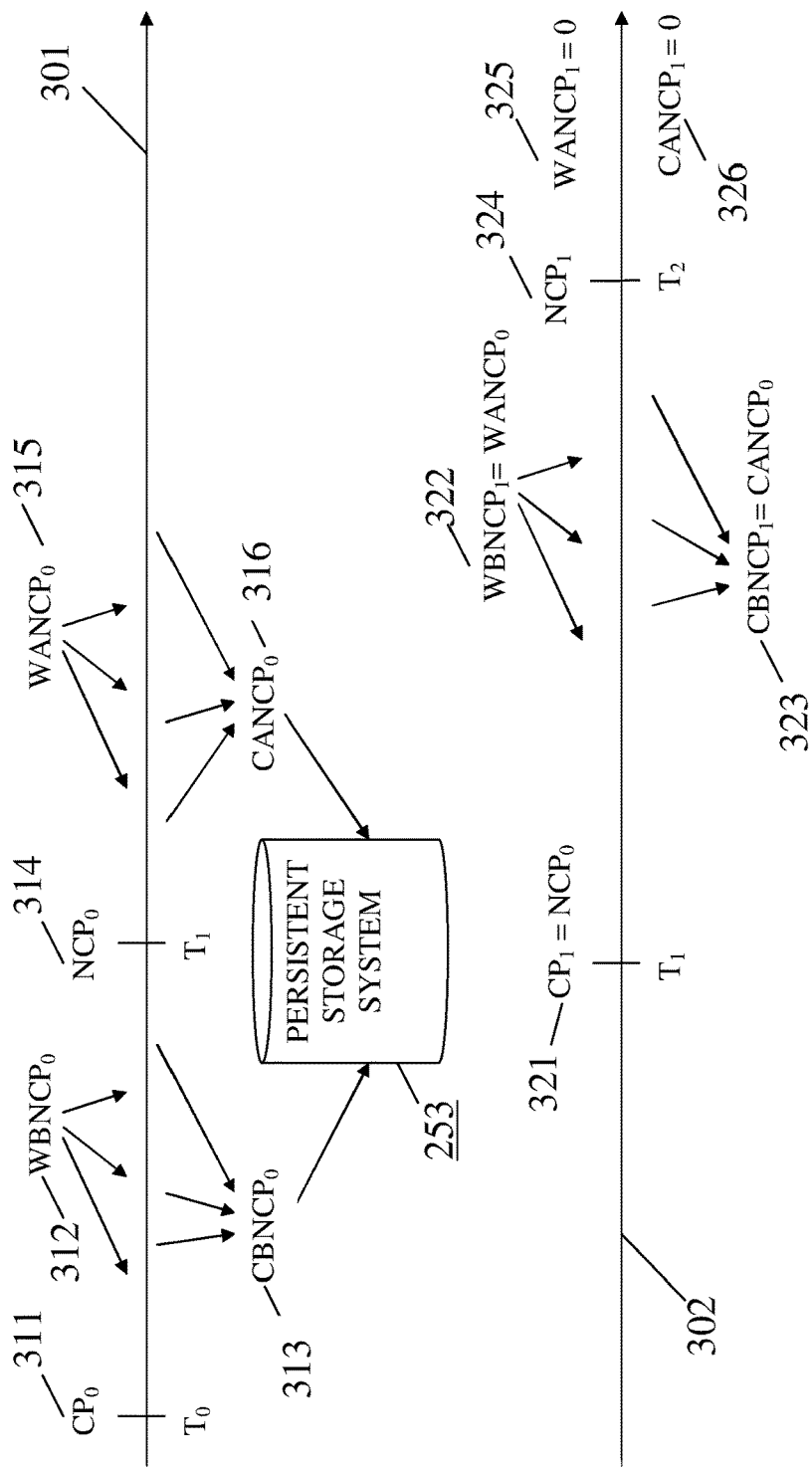
FIG. 3 schematically shows counters and consistency point objects along time lines according to illustrative embodiments of the present invention.

Reference is made to FIG. 3 which schematically shows counters and consistency point objects along time lines according to illustrative embodiments of the present invention.

As shown by $CP_0$ 311, $NCP_0$ 314, $CP_1$ 321, and $NCP_1$ 324 along timelines 301 and 302, an embodiment may maintain, update, set values in, and/or use as described a set of CP and NCP objects. As shown by $WBNCP_0$ 312, $CBNCP_0$ 313, $WANCP_0$ 315, $CANCP_0$ 316, $WBNCP_1$ 322, $CBNCP_1$ 323, $WANCP_1$ 325 and $CANCP_1$ 326 along timelines 301 and 302, an embodiment may maintain, update, set values in, and/or use as described a set of counters.

For example, e.g., when storage system 210 is initialized before a first use (for example, when system 100 is deployed, after formatting disks as known in the art or before data is stored in storage system 210 for the first time), the time value in $CP_0$ 311 may be stored as or set to the current time, e.g., $T_0$ may be 10:00 and the time value in $CP_0$ 311 may be stored as or set to 10:00. The time value in $NCP_0$ 314 may set or changed according to a predefined interval as included or stored in configuration data 136, e.g., if an initial predefined interval in configuration data 136 is one minute then $T_1$ may be 10:01 and the time value in $NCP_0$ 314 may set to 10:01. Accordingly, the time $T_0$ in $CP_0$ 311 may be a consistency time point, e.g., last known time when consistency is guaranteed, e.g., since at time T0 no user writes that were not yet committed to persistent storage system 253 exist.

$WBNCP_0$ 312 may be used to count user writes that occurred before the time included or stored in $NCP_0$ 314. For example, each time a write request or command is received by storage system 210 from one of client computing devices 210, the value in $WBNCP_0$ 312 may be incremented such that $WBNCP_0$ 312 reflects, indicates, includes or stores the number of user writes that occurred before the time included or stored in $NCP_0$ 314. It is noted that the data or payload in user writes counted by $WBNCP_0$ 312 may be stored in cache 252 but may not yet be stored in persistent storage system 253.

$CBNCP_0$ 313 may be used to count user writes that were stored in, or committed to, persistent storage system 253, before the time in $NCP_0$ 314. For example, each time the payload or data in a write request or command received by storage system 210 from one of client computing devices 210 is copied (or moved) from cache 252 to persistent storage system 253, the value in $CBNCP_0$ 313 may be incremented such that $CBNCP_0$ 313 reflects, indicates, includes or stores the number of user writes that were stored in, or committed to, persistent storage system 253 before the time in $NCP_0$ 314.

$WANCP_0$ 315 may be used to count user writes that occurred after the time included or stored in $NCP_0$ 314. For example, each time a write request or command is received by storage system 210 from one of client computing devices 210 after the time included or stored in $NCP_0$ 31 (e.g., a write that occurred after $T_1$ that, in this example is 10:01), the value in $WANCP_0$ 315 may be incremented such that $WANCP_0$ 315 reflects, indicates, includes or stores the number of user writes that occurred after the time in $NCP_0$ 314. It is noted that the data or payload in user writes counted by $WBNCP_0$ 312 may be stored in cache 252 but may not yet be stored in persistent storage system 253.

$CANCP_0$ 316 may be used to count user writes that were stored in or committed to, persistent storage system 253, after the time in $NCP_0$ 314. For example, each time the payload or data in a write request or command received by storage system 210 from one of client computing devices 210 is copied (or moved) from cache 252 to persistent storage system 253 at a time that is later than the time in $NCP_0$ 314 (e.g., after 10:01 in this example), the value in $CANCP_0$ 316 may be incremented such that $CANCP_0$ 316 reflects, indicates, includes or stores the number of user writes that were stored in, or committed to, persistent storage system 253 after the time in $NCP_0$ 314.

If, at some point in time, during operation, the value in $WBNCP_0$ 312 is equal to the value in $CBNCP_0$ 313 and the current time is later or greater than the time in the $NCP_0$ then an embodiment may advance, or shift in time, a consistency time point as shown by timeline 302 and related consistency points and counters. For example, if at a time that is after $T_1$ in $NCP_0$, e.g., at time 10:02, $WBNCP_0$ 312 is equal to $CBNCP_0$ meaning that all user writes (counted by $WBNCP_0$ 312) were stored in persistent storage system 253 (counted by $CBNCP_0$) then, as shown by $CP_1=NCP_0$ 321, a new CP may be scored or set by including, or setting, the time in the new CP according to the time of $NCP_0$, and a new NCP as shown by may be set as shown by $NCP_1$ 324. Accordingly, the consistency point of a system may be moved forward in time, e.g., from 10:00 to 10:01 by setting $CP_1$ to value of $NCP_0$.

As further shown, upon moving the consistency point forward, counters may be updated. For example and as shown, the value in $WBNCP_1$ 322 that reflects or indicates the number of writes before the time included or stored in $NCP_1$ 324 (that may be, for example, 10:03) may be stored as or set to the value of $WANCP_0$ 315, e.g., since writes that occurred after $NCP_0$ 314 occurred before the time in $NCP_1$ 324, the value of $CBNCP_1$ 323 may be set to the value of $CANCP_0$ 316, e.g., since the writes committed before NCP1 occurred after the time included or stored in $NCP_0$. As further shown, the values of $WANCP_1$ 325 and $CANCP_1$ 326 may be set to zero ("0") reflecting the fact that no writes or commits occurred after the time included or stored in $NCP_1$. It will be understood that FIG. 3 provides a simplified example, for example, the same object may be used for $CANCP_0$ 316 and $CANCP_1$ 326 and only the values stored in the object may be replaced or set, similarly, the same object may be used for $WBNCP_1$ 322 and $WBNCP_0$ 312. For example, four objects representing writes before, committed before, writes after and committed after may suffice and their respective values may be set as shown by FIG. 3. The operations of advancing a CP (e.g., moving a consistency point from $CP_0$ to $CP_1$) as described herein, e.g., with reference to FIG. 3, may be repeated continuously or iteratively in time such that a consistency point of a system moves in time and, accordingly, when rebooting, turning on or otherwise activating a system, e.g., after a crash, the time of the last consistency point may be a very short time in the past, e.g., minutes or even seconds. For example, similarly to a consistency point move from $T_0$ to $T_1$ as described, the consistency point may be moved to $T_3$ (e.g., to 10:03), $T_4$, $T_5$ and so on.

Accordingly, in some embodiments, a flow may include: updating a CP timestamp object to include a selected CP timestamp; updating an NCP object parameter to include an NCP timestamp, the NCP timestamp later or greater than the CP timestamp; continuously updating user writes before NCP (WBNCP) counter to include the number of user write operations that occurred before the time in the NCP timestamp object; continuously updating user writes after NCP (WANCP) counter to include the number of user write operations that occurred after the time in the NCP timestamp object; updating user writes committed before NCP (CBNCP) counter to include the number of user write operations that included writing data to a persistent storage system and that occurred before the time in the NCP timestamp object; updating user writes committed after NCP (CANCP) counter to include the number of user write operations that included writing data to a persistent storage system and that occurred after the time included or stored in the NCP timestamp object.

If the WBNCP counter is equal to the CBNCP counter and the current time is later or greater than the time in the NCP timestamp object then the flow may include: storing, updating or setting the CP timestamp object to include the NCP timestamp; selecting a timestamp later or greater than the NCP timestamp and updating the NCP timestamp object to include the selected timestamp; updating the WBNCP counter to include the value in the WANCP counter; updating the CBNCP counter to include the value in the CANCP counter, and resetting the WBNCP and WANCP counters to zero.

In some embodiments, a timestamp for each user write operation that included writing data to persistent storage system 253 may be stored, e.g., in persistent storage system 253 and in association with the data of the user write operation. For example, when data to be stored in storage system 210, received from a user (e.g., from one of client computing devices 210) is stored in persistent storage system 253, a timestamp may be stored with the data such that the time the data was written to storage may be readily determined. A CP and timestamps associated with data as described may enable an embodiment to restore, revert or initialize a system to a consistent state or point, e.g., to a point in time where a user knows exactly which data was lost and which is stored in a storage system. For example, to configure, initialize, revert or restore a storage system to a consistent, known state, an embodiment may delete, from a persistent storage device (e.g., delete from persistent storage system 253) all user writes that occurred after the time included or stored in a CP object, e.g., all data objects with a timestamp that is later or greater than the timestamp or value in the last CP. For example and as described, a CP may be repeatedly advanced or shifted in time and the current or last CP may be stored, e.g., in persistent storage system 253. Accordingly, upon initializing storage system 210, an embodiment may retrieve the last CP and delete, e.g., from persistent storage system 253, all data that is related to user writes that occurred after the time in the retrieved CP object.

In some embodiments, storing, updating or setting a value in an NCP (e.g., in $NCP_1$ 324) may be according to various aspects, considerations or logic. In some embodiments, the interval between the current time and an NCP may be dynamically determined and/or set. For example, selecting a time for setting the value in an NCP such as $NCP_1$ 324 may be according to a number of user writes per time period or according to an expected number of user writes per time period. For example, an embodiment may record the number of user writes per minute or second and/or calculate an average rate of user writes, and set an NCP value accordingly. For example, if the average or expected number of user writes is low (e.g., a few writes every minute) then a system may set a time value in an NCP object that is relatively large, e.g., five or ten minutes ahead of a CP. For example, if it is determined or identified that only a few user write commands to storage system 210 are received per minute then SMU 251 may set the time in $NCP_1$ 324 to ten minutes after the value included or stored in $CP_1$, but, if SMU 251 determines that hundreds of writes to storage system 210 occur every minute then SMU 251 may set the time in $NCP_1$ 324 to 20 seconds after the value included or stored in $CP_1$. Setting the time value in an NCP may be dynamic. For example, SMU 251 may continuously monitor the rate or frequency of writes to storage system 210 and may adjust the time distance between an NCP and CP dynamically. For example, the time distance or difference between the value in an NCP and the value in a CP may be relatively short (e.g., 30 seconds) during working hours when may writes are received but may be increases (e.g., to five minutes) during nights and weekends.

SMU 251 may set, store or change the time value in an NCP (e.g., in $NCP_1$ 324) based on the size of cache 252. For example, to make sure that cache 252 is not filled with data not yet written to persistent storage 253, SMU 251 may set the time value in an NCP such that a predefined percentage of cache 252 is not used. For example, SMU 251 may check the capacity or usage of cache 252 and, if SMU 251 determines that cache 252 is using more than 65% of its volatile memory, SMU 251 may decrease the time distance between a CP and an NCP. Since after a consistency point is set, all data in cache 252 that was written to persistent storage system 253 may be safely removed from cache 252, by decreasing the time distance between a CP and an NCP, utilization of cache 252 may be reduced. Accordingly, an embodiment may continuously, repeatedly, iteratively and/or dynamically adjust a time distance between a CP and an NCP, e.g., based on a frequency of write operations and/or a utilization of a cache.

As described, a CP may be moved, advanced or shifted in time if the number of writes (e.g., number of writes to cache 252) before an NCP is equal to the number of writes committed to, or stored in a persistent storage system (e.g., the number of commits to persistent storage system 253). An embodiment may check if these counters are equal (e.g., check if $WBNCP_0$ is equal to $CBNCP_0$) at predefined time intervals (e.g., based on a value in configuration data 133) or based on number of expected, or average, user writes per time period, based on a frequency or rate of user writes, and/or based on a size of a cache memory.

Any number of criteria, rules, thresholds or conditions may be used to move or shift a CP. For example, in some embodiments, CP is moved, advanced or shifted in time if, or when, the number of writes to a cache is equal to the number of commits to a persistent storage (e.g., $WBNCP_0$ is equal to $CBNCP_0$), and the current time is later or greater than the time in the respective NCP object.

For example, if SMU 251 determines that cache 252 is using more than a predefined amount or percentage of its capacity, SMU 251 may decrease the time intervals used for checking if the number of writes is equal to the number of commits thus increasing the frequency of advancing a CP as described, e.g., by checking whether or not the number of writes is equal to the number of commits more often, the CP may be moved, or advance in time, more often since, each time the number of writes is equal to the number of commits a CP may be moved in time as described.

SMU 251 may determine the number of expected user writes per time or an average user writes per time or a frequency or rate of user writes, and adapt the rate with which it checks if the number of writes is equal to the number of commits accordingly. For example, if the frequency or rate of user writes is high, MSU 251 may check if the number of writes is equal to the number of commits more often and, if or when the frequency or rate of user writes is low or decreases, MSU 251 may check the write and commit counters less often. It will be noted that the rate with which MSU 251 checks the counters of writes and commits as described may be dynamic, e.g., MSU 251 may check the counters more often or at a higher rate when storage system 210 is loaded by frequent writes and may reduce the rate of checking the counters when storage system 210 is under light load or is relatively idle.

Figure 4:
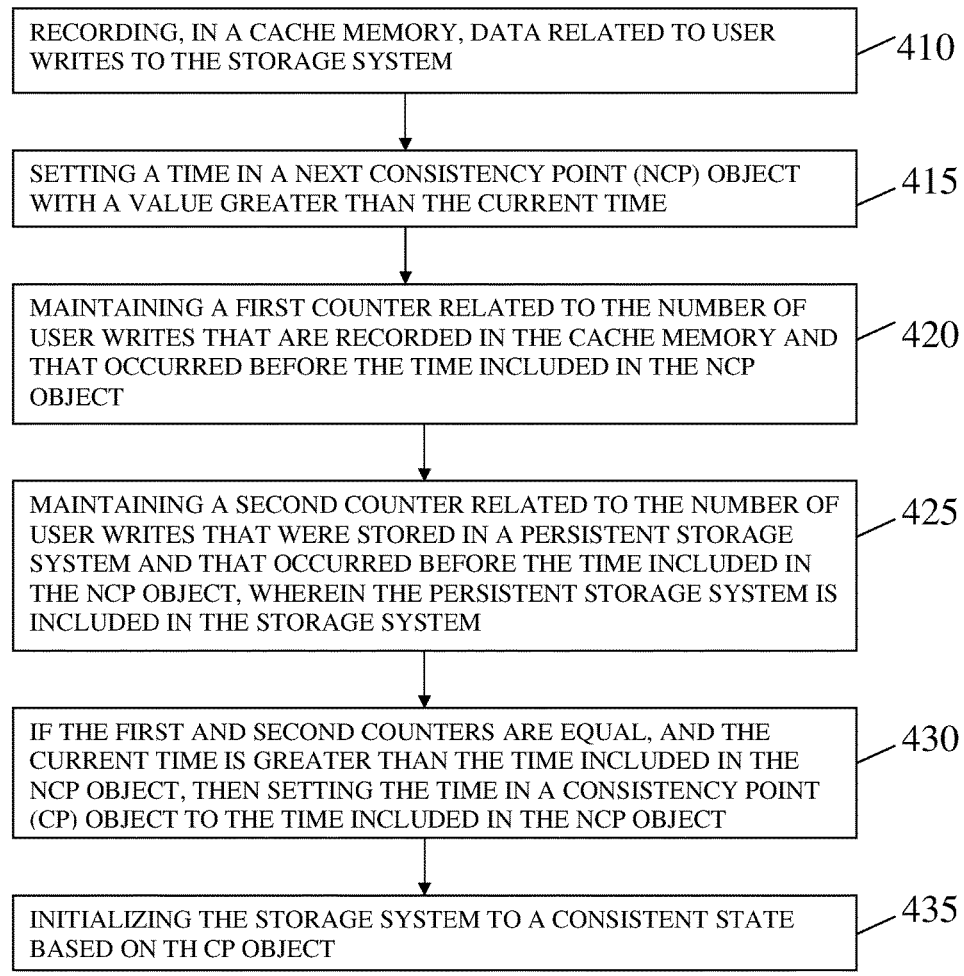
FIG. 4 shows a flowchart of a method according to illustrative embodiments of the present invention.

Reference is made to FIG. 4, a flowchart of a method according to illustrative embodiments of the present invention. As shown by block 410, data related to user writes to a storage system may be recorded in a cache. For example, data related to user writes may be or may include a file to be stored in a database (e.g., a database in persistent storage 201) or any other data or object that a user or application stores in a storage system as known in the art. For example, user writes as referred to herein may be, or may include, a message that includes a command to store data and a payload that includes the actual data to be stored and at least the payload to be stored may be recorded or stored in a cache as described. As further described, data stored or recorded in a cache (e.g., in cache 252) may be committed to persistent storage 253, e.g., the data may be copied or moved from cache 252 to persistent storage 253. Data related to user writes recorded in a cache may include metadata, e.g., a time the data was received by a storage system, the size or amount of data to be stored and the like. For example, data written to storage system 201 by a user of client computing device 210 may be stored in cache 252. As shown by block 415, a time value that is later or greater than the current time (e.g., in the future compared to the current time) may be set or saved in an NCP object. For example, if the current time is 15:00 then the time in $NCP_0$ may be set or changed to 15:10. The time may include a day and/or date, or another value.

As shown by block 420, a first counter related to the number of user writes that are recorded in the cache memory and that occurred before the time included or stored in the NCP object may be maintained or updated such the first counter includes, represents or indicates the number of writes to the cache that happened or took place before the time in the NCP object. For example, $WBNCP_0$, may include the number of writes to cache 252 that occurred before the time in $NCP_0$, $CBNCP_0$ may include the number of commits to persistent storage 253 that occurred before the time in $NCP_0$, $WANCP_0$ may include the number of writes to cache 252 that occurred after the time in $NCP_0$, and $CANCP_0$ may include the number of commits to persistent storage 253 that occurred after the time in $NCP_0$. For example, an embodiment may update or otherwise maintain $WBNCP_0$ such that $WBNCP_0$ includes, reflects or indicates the number of writes to cache 252 before the time in $NCP_0$. For example, a value in $WBNCP_0$ may be incremented each time a write to cache 252 is performed or detected.

In some embodiments, instead of the number of writes to a cache and/or commits to a persistent storage as described, the counters may include timestamps. For example, $WBNCP_0$, may include the time (or timestamp) of the last write to cache 252 that occurred before the time in $NCP_0$, $CBNCP_0$ may include the time (or timestamp) of the last commit to persistent storage 253 that occurred before the time in $NCP_0$, $WANCP_0$ may include the time (or timestamp) of the last write to cache 252 that occurred after the time in $NCP_0$, and $CANCP_0$ may include the time (or timestamp) of the last commit to persistent storage 253 that occurred after the time in $NCP_0$.

Any operations and logic described herein with respect to counters that include the number of writes and commits may done or enabled using objects that include a time or timestamp of a last write to a cache and a last commit to a persistent storage.

For example, to use a set of timestamps instead of, or in addition to a set of counters (e.g., $WBNCP_0$, $CBNCP_0$, $WANCP_0$, and $CANCP_0$ as described) an embodiment may set a time in an NCP object with a value later than the current time, and, instead of, or in addition to, updating counters with a number of writes and commits, the embodiment may update a first object (e.g., one similar to an NCP or CP) to include the time of the last data write to cache 252 performed before a time included the NCP object.

The embodiment may further update a second object to include the time of the last data write to a persistent storage system performed before the time included in the NCP object and, if the values in the first and second objects are equal (e.g., the first and second objects include the same time or timestamp), and the current time is later than the time included in the NCP object, then the embodiment may update the time in a CP object with the time included in the NCP object if the values (or times or timestamps) in the first and second objects are equal, and the current time is greater than the time included in the NCP object, then an embodiment may update the time in the CP object with the time included in the NCP object.

An embodiment may further maintain a third object that includes the time of the last user write recorded in a cache memory after the time in the NCP object and maintain a fourth object that includes the time of the last user write that was stored in the persistent storage system after the time in the NCP object and, upon updating the time in the CP object as described, an embodiment may update the first object with the value of the third object and updating the second object with the value of the fourth object.

As shown by block 425, a second counter related to the number of user writes that were stored in a persistent storage system and that occurred before the time stored included in the NCP object may be maintained or updated such the second counter includes, represents or indicates the number of data writes to the persistent storage system that happened or took place before the time included in the NCP object. For example, a value in $CBNCP_0$ may be incremented each time a write to persistent storage system 253 is performed or detected.

As shown by block 430, if the first and second counters are equal, and the current time is later or greater than the time included in the NCP object, then the time in a CP object may be set to the time included in the NCP object. For example, if the values of or in $WBNCP_0$ and $CBNCP_0$ are same, equal or identical and the current time is greater than the time in $NCP_0$ 314 then the time in $NCP_0$ 314 may be copied into $CP_1$ 321 (e.g., as shown by "$CP_1=NCP_0$" in FIG. 3). If the first and second counters are not equal (e.g., not all writes to cache 252 were committed to persistent storage 253) or if the current time is not later or greater than the time included in the NCP object, e.g., an embodiment checked the counters before the time included, stored or represented by a timestamp in the NCP object, then an embodiment may schedule a subsequent checking of the counters or wait for a condition or time for checking the counters again. Accordingly, determining whether or not first and second counters are equal may be repeated endlessly, e.g., in a loop as known in the art or until the counter are equal.

As shown by block 435, the storage system may be initialized to a consistent state based on the CP object. For example, storage system 201 may be initialized or configured to a consistent state by deleting, from persistent storage system 253, data related to user writes that occurred after the time included or stored in a CP object as described. In some embodiments, a single CP object may be used for, or associated with, a storage system, e.g., $CP_0$ and $CP_1$ may be the same object that is periodically, iteratively or otherwise updated to include the time of an NCP object as described. Accordingly, based on a CP used for, or associated with, a storage system, the storage system may be initialized, configured or set to a consistent state since the CP object may include the last known time when the storage system was in a consistent state, e.g., a state where all writes to a caching system were also committed to a persistent storage device. Generally, consistency (or consistent state) as referred to herein relates to a state of a storage system with respect to data and time. For example, the state of storage system 201 may be (or may be regarded or viewed as) consistent if it is known that all writes to the system (e.g., to cache 252) were committed to persistent storage system 253 and thus, if storage system 201 is shut down and then powered up, a user knows that all writes to the system are in the system. In contrast, an inconsistent state is a state where some, but not necessary all of the writes to storage system 201 were committed to persistent storage system 253, accordingly, when storage system 201 is in an inconsistent state and is shut down and then powered up, a user cannot and does not know whether or not all writes to storage system 201 are indeed stored in the storage system.

An embodiment may maintain consistency of a storage system and/or data integrity in the storage system using counters and time objects. An embodiment may set or store a time in an NCP object with a value greater than the current time, e.g., as described with respect to $NCP_0$ and $NCP_1$ and record, store or include, in a cache memory, data related to user writes to the storage system, for example, data to be stored in storage system 201, e.g., received from client computing devices 210 and referred to herein as user writes, may be stored or recorded in cache 252. An embodiment may update a first counter to include, reflect or represent the number of data writes to a caching system performed before a time included in the NCP object (e.g., setting or updating a value in $WBNCP_0$ as described) and performed after a time in a CP object. For example, counter $WBNCP_0$ may count data (or user) writes to cache 252 that occurred after the time in $CP_0$ and before the time in $NCP_0$.

An embodiment may update a second counter to include the number of data writes to a persistent storage system performed before the time included in the NCP object (e.g., setting or updating a value in $CBNCP_0$ as described) and performed after a time in a CP object. For example, counter $CBNCP_0$ may include the number of user or data writes or commits to persistent storage system 253 that occurred after the time in $CP_0$ and before the time in $NCP_0$.

As described, if the numbers or values in the first and second counters are equal, and the current time is greater than the time included in the NCP object, then an embodiment may update the time in the CP object with the time included in the NCP object (e.g., an embodiment may update, set or modify $CP_0$ with, based, or according to, a time value in $NCP_0$ to produce $CP_1$ as described). A CP object may include a timestamp of a time when the state of the storage system is known and consistent, e.g., it may be known that all writes to a caching system that occurred or that took place before, or at, the time in the CP, were also written to a persistent storage device. Accordingly, a CP object may be used to configure, set or initialize the storage system to a consistent or known state. For example, after a crash, storage system 201 may be configured, set or initialized to its state at the time in CP0 or in CP1, a state where all data that was written to, or stored in, cache 252 was also written to, or stored in, persistent storage 253. As described, the current time is before or earlier than the time included in the NCP object an embodiment may repeat the operation of checking the numbers or values in the first and second counters as described, e.g., repeatedly or periodically or based on an event.

In the description and claims of the present application, each of the verbs, "comprise" "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Some embodiments utilize only some of the features or possible combinations of the features. Variations of embodiments of the invention that are described, and embodiments comprising different combinations of features noted in the described embodiments, will occur to a person having ordinary skill in the art. The scope of the invention is limited only by the claims.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A computer-implemented method of managing a storage system, the method comprising: recording, in a cache memory, data related to user writes to the storage system; setting a time in a next consistency point (NCP) object with a value greater than the current time; maintaining a first counter related to the timber of user writes that are recorded in the cache memory and that occurred before the tune included in the NCP object and after a time included in a consistency point (CP) object and maintaining a second counter related to the number of user writes that were stored in a persistent storage system and that occurred before the time included in the NCP object and after a time included in the CP object, wherein the persistent storage system is included in the storage system; using the CP object to configure the storage system to a consistent state; and maintaining a third counter related to the number of user writes recorded in the cache memory after the time in the NCP object; maintaining a fourth counter related to the number of user writes that were stored in the persistent storage system after the time in the NCP object; and if the first and second counters are equal, and the current time is greater than the time included in the NCP object, then updating the time in the CP object with the time included in the NCP object.

2. The method of claim 1, comprising: upon updating the time in the CP object, updating the first counter with the value of the third counter and updating the second counter with the value of the fourth counter.

3. The method of claim 1, wherein updating the time in the NCP object includes:
   selecting a time interval value based on at least one of: a predefined time interval, a number of expected user writes per time period and a size of the cache memory; and
   selecting a value for the time in the NCP object based on the time in the CP object and based on the selected time interval.

4. The method of claim 1, comprising checking if the first and second counters are equal based on at least one of: a predefined time interval, a number of expected user writes per time period and a size of the cache memory.

5. The method of claim 1, comprising initializing the storage system to a consistent state by deleting, from the persistent storage system, data related to user writes that occurred after the time in the CP object.

6. The method of claim 5, comprising:
   saving a timestamp for each user write operation that included writing data to the persistent storage system; and
   deleting, from the persistent storage system, all user writes associated with a time value that is greater than the time in the CP object.

7. The method of claim 1, wherein the cache memory includes a volatile memory.

8. The method of claim 1, wherein updating the time in the NCP object includes:
   selecting a time interval value based on at least one of: a predefined time interval, a number of expected user writes per time period and a size of the cache memory; and
   selecting a value for the time in the NCP object based on the time in the CP object and based on the selected time interval.

9. A system comprising: a memory; and a controller to record, in a cache memory, data related to user writes to the storage system; set a time in a next consistency point (NCP) object with a value greater than the current time; maintain a first counter related to the number of user writes that are recorded in the cache memory and that occurred before the time included in the NCP object and after a time included in a consistency point (CP) object; maintain a second counter related to the number of user writes that were stored in a persistent storage system and that occurred before the time included in the NCP object and after a time included in the CP object, wherein the persistent storage system is included in the storage system; and using the CP object to configure the storage system to a consistent state; wherein the controller is to maintain a third counter related to the number of user writes recorded in the cache memory after the time in the NCP object; maintain a fourth counter related to the number of user writes that were stored in the persistent storage system after the time in the NCP object; and if the first and second counters are equal, and the current time is greater than the time included in the NCP object, then update the time in the CP object with the time included in the NCP object.

10. The system of claim 9, wherein the controller is configured to, upon updating the time in the CP object, update the first counter with the value of the third counter and update the second counter with the value of the fourth counter.

11. The system of claim 9, wherein updating the time in the NCP object includes:
    selecting a time interval value based on at least one of: a predefined time interval, a number of expected user writes per time period and a size of the cache memory; and
    selecting a value for the time in the NCP object based on the time in the CP object and based on the selected time interval.

12. The system of claim 9, wherein the controller is configured to check if the first and second counters are equal based on at least one of: a predefined time interval, a number of expected user writes per time period and a size of the cache memory.

13. The system of claim 9, wherein the controller is configured to initialize the storage system to a consistent state by deleting, from the persistent storage system, data related to user writes that occurred after the time in the CP object.

14. The system of claim 13, wherein the controller is configured to:
    save a timestamp for each user write operation that included writing data to the persistent storage system; and
    delete, from the persistent storage system, all user writes associated with a time value that is greater than the time in the CP object.

15. The system of claim 9, wherein the cache memory includes a volatile memory.

16. A computer-implemented method of maintaining consistency of a storage system, the method comprising: setting a time in a next consistency point (NCP) object with a value later than the current time; updating a first object to include the time of the last data write to a caching system performed before a time included in the NCP object; updating a second object to include the time of the last data write to a persistent storage system performed before the time included in the NCP object; if the values in the first and second objects are equal, and the current time is later than the time included in the NCP object, then updating the time in a consistency point (CP) object with the time included in the NCP object; and using the time in the CP object to configure the storage system to a consistent state; and updating a third object related to the time of the last user write recorded in the cache memory after the time in the NCP object; updating a fourth object related to the time of the last user write that was stored in the persistent storage system after the time in the NCP object; and upon updating the time in the CP object, updating the first object with the value of the third object and updating the second object with the value of the fourth object.

17. The method of claim 16, comprising:
  if the values in first and second objects are equal, and the current time is greater than the time included in the NCP object, then updating the time in the CP object with the time included in the NCP object.

* * * * *